(12) United States Patent
Sances (10) Patent No.: US 11,980,213 B1
(45) Date of Patent: May 14, 2024

(54) SYSTEM AND METHOD FOR BOTTLING FIBER-FORTIFIED LIQUID MIXTURE

(71) Applicant: Aimee Sances, Merritt Island, FL (US)

(72) Inventor: Aimee Sances, Merritt Island, FL (US)

( * ) Notice: Subject to any disclaimer, the term of this patent is extended or adjusted under 35 U.S.C. 154(b) by 0 days.

(21) Appl. No.: 17/552,214

(22) Filed: Dec. 15, 2021

Related U.S. Application Data (60) Provisional application No. 63/125,451, filed on Dec. 15, 2020.

(51) Int. Cl.
| | |
|---|---|
| *B01F 35/22* | (2022.01) |
| *A23L 2/52* | (2006.01) |
| *A23L 2/72* | (2006.01) |
| *A23L 33/16* | (2016.01) |
| *B01F 33/84* | (2022.01) |
| *B01F 35/213* | (2022.01) |
| *B01F 35/83* | (2022.01) |
| *B65D 65/46* | (2006.01) |
| *B67C 3/22* | (2006.01) |
| *B67C 3/28* | (2006.01) |
| *G05D 11/13* | (2006.01) |

(52) U.S. Cl.
CPC ............... *A23L 33/16* (2016.08); *A23L 2/52* (2013.01); *A23L 2/72* (2013.01); *B01F 33/84* (2022.01); *B01F 35/213* (2022.01); *B01F 35/2202* (2022.01); *B01F 35/833* (2022.01); *B65D 65/466* (2013.01); *B67C 3/22* (2013.01); *B67C 3/28* (2013.01); *G05D 11/139* (2013.01)

(58) Field of Classification Search
CPC ...... B67C 3/28; B01F 35/833; B01F 35/2202; B01F 33/84; G05D 11/139

USPC .................................................. 141/104, 105
See application file for complete search history.

(56) References Cited

U.S. PATENT DOCUMENTS

| | | | |
|---|---|---|---|
| 4,988,530 A | 1/1991 | Hoersten et al. | |
| 5,851,578 A | 12/1998 | Gandhi | |
| 6,248,390 B1 | 6/2001 | Stillman | |
| 7,115,297 B2 | 10/2006 | Stillman | |
| 7,892,586 B2 | 2/2011 | Stillman | |
| 8,944,120 B2 * | 2/2015 | Neuhauser | ................ B67C 3/02 141/105 |
| 9,717,267 B2 | 8/2017 | Prakash et al. | |
| 2003/0211201 A1 | 11/2003 | Stillman | |
| 2007/0098763 A1 | 5/2007 | Sinnott | |
| 2007/0218170 A1 | 9/2007 | Kendrick | |

(Continued)

FOREIGN PATENT DOCUMENTS

WO 2004023898 A2 3/2004

*Primary Examiner* — Jason K Niesz
(74) *Attorney, Agent, or Firm* — John Rizvi; John Rizvi, P.A—The Patent Professor®

(57) ABSTRACT

A system and method of bottling a fiber-fortified liquid mixture. The method includes introducing liquid and a fiber fortified formulation into a control system utilizing a specialized process to mix the liquid with the fiber fortified formulation. In one exemplary embodiment, the fiber-fortified formulation generally comprises a plant-based nutrient ("fiber") and vitamins, which are mixable in a liquid to form the fiber-fortified liquid mixture. The system may include a plurality of reservoirs, sensors, control valves, at least one logic controller that is electronically connected to the sensors and control valves, a pasteurizer, and a bottling machine that bottles the fiber fortified formulation into specialized biodegradable bottles.

11 Claims, 4 Drawing Sheets

(56) References Cited

U.S. PATENT DOCUMENTS

2007/0298078 A1    12/2007   Harrison et al.
2010/0278981 A1    11/2010   Ervin
2020/0254409 A1*  8/2020   Savino .................. B01F 35/881

* cited by examiner

SYSTEM AND METHOD FOR BOTTLING FIBER-FORTIFIED LIQUID MIXTURE

CROSS-REFERENCE TO RELATED APPLICATIONS

This application claims the benefit of U.S. Provisional Patent Application Ser. No. 63/125,451, filed on Dec. 15, 2020, which is incorporated herein in its entirety.

FIELD OF THE INVENTION

The present invention generally relates to systems and methods, and more particularly, to a system and method for bottling a fiber-fortified liquid mixture for daily consumption by a consumer, where the fiber-fortified liquid mixture is flavorless and may include a neutral acidity.

BACKGROUND OF THE INVENTION

The combination of diet and exercise are considered gold standard practices necessary for maintaining a healthy lifestyle. Not only are they proven to provide immediate mental health improvement, but also serve as a preventative measure against the development of disease and maladaptive behaviors. As research suggests, combining diet and physical activity are more effective for weight loss over twelve months than interventions based on diet or physical activity alone. However, light exercise for thirty minutes to two hours, four to five times a week is not as time consuming or difficult to adhere to than the diet. Thinking of the diet, planning the next meal, adhering to the regimen despite temptations, and cooking the daily meals is more taxing than the exercise. This leads to the conclusion that dieting may be more difficult, and important, than exercise to many who aspire to become healthier.

Different dieting methods gained popularity in the 21st century. Diets recommended by physicians or championed by celebrities, such as ketogenic diet, veganism, Mediterranean diet, etc. are all examples of ways in which individuals can adhere to a dietary plan that contains food they love while promoting weight loss and a healthier well-being. On the other side of the spectrum are food types generally warned against consumption, such as GMOs (genetically modified organisms) or those that have been processed (contain additives) and are no longer described as natural. Despite the differences between these diets, there is agreement between the essential daily nutrients required for the body to function properly. These essential nutrients include popular ones, such as protein, carbohydrates, fats, and vitamins. However, an often-overlooked dietary necessity is fiber.

The consumption of dietary fiber has been linked with a host of potential health benefits, including reduced risk of cardiovascular disease, coronary heart disease, stroke, hypertension, and many others. Furthermore, a high intake of dietary fiber has been suggested to support the regulation of energy intake and satiety, which could favorably contribute to the increasing obesity problem. Generally, recommendations suggest that adults consume 38 grams of fiber per day under the age of 50, and 30 grams over for adults over the age of 50. For women under 50 years old, 25 grams is recommended, while those who are over the age of 50 should consume 21 grams of dietary fiber per day. Unfortunately, most Americans consume approximately half of the amount of fiber recommended by the National Academies of Sciences, Engineering, and Medicine; only about 5% of the population meets the recommendations for dietary fiber intake. The 2015-2016 National Health and Nutrition Examination Survey revealed that the mean fiber intake for adults 20 years and older was only 17.3 grams per day. It is not surprising then, that research suggests in the United States alone, 11% of the population suffer from a chronic digestive disease, with a prevalence rate as high as 35% for those 65 years and over. This has a sizeable economic and social impact that must not be ignored.

As can be assumed, the demand for fiber-based food and beverages is increasing in the global market. Since consumers are actively looking for ways to add fiber to their daily routine, a fiber fortified beverage adds functionality to drinks and provides an additional value. As mentioned, exercise is also a necessary component to maintaining a healthy lifestyle, and exercise requires consumption of copious amounts of liquids. The addition of fiber and potentially other nutrients to a liquid will make it simple for individuals to achieve their daily nutritional goal.

Because of the aforementioned statistics on fiber deficient diets known to be affecting a large population of United States, along with the gastrointestinal consequences that arise from it, there is an unmet need for a beverage that not only hydrates the individual during a workout or throughout their day, but also provides them with the necessary fiber to complement their diet. Such beverage may also contain other macronutrients or micronutrients to ensure the daily diet requirements are met. Since fiber is not a nutrient repeatedly referred to, like protein and carbohydrates, it is often overlooked and effortlessly ignored.

SUMMARY OF THE INVENTION

The present invention is directed to a system and method for bottling a fiber-fortified liquid mixture readily available for daily consumption by a consumer. The fiber-fortified liquid mixture, in one exemplary embodiment, includes a ready to drink fiber fortified water beverage that is, in some instances, carbonated and contains antioxidants, has no discernable flavor (i.e., flavorless), and has a pH value higher than 4. The fiber-fortified liquid mixture includes a novel fiber-rich formulation that dilutes when mixed with a liquid, such as water, to provide a smooth fiber-rich supplement to a consumer.

Introducing a first embodiment of the invention, the present invention consists of a method for producing and packaging a fiber-fortified liquid mixture, the method comprising the steps of:
pumping liquid into a closed-loop, liquid mixing controller;
pumping a fiber soluble mixture in the closed-loop, water mixing controller;
mixing the liquid with the fiber soluble mixture in a mixing tank to produce a fiber fortified liquid mixture; and
bottling the fortified liquid into a bottle.

In another aspect, the fiber fortified liquid mixture may include a predetermined concentration of the fiber soluble mixture relative to the liquid volume.

In another aspect, the closed-loop, liquid mixing controller may include a computerized controller that adjusts the mixing conditions of the liquid with the fiber soluble mixture in the mixing tank. The computerized controller is capable of varying and controlling the mixing concentrations based on a real-time feedback system.

In another aspect, the feedback system includes a plurality of sensors disposable inside of the mixing tank that measure the concentrations level of the liquid and the fiber soluble mixture. The feedback system ensures that the fiber fortified liquid mixture bottled inside of the bottle includes a predetermined concentration of the fiber soluble mixture relative to the liquid volume.

In another aspect, the closed-loop, liquid mixing controller may include at least one digital hydrometer that measures the specific gravity or density of the liquid pumped into a mixing controller valve. The closed-loop, liquid mixing controller, may include at least one other hydrometer that measures and compares the specific gravity or density of the fiber fortified liquid mixture to validate or otherwise ensure that the fiber fortified liquid mixture includes a fiber concentration level that is within the expected value.

In another aspect, the closed-loop, liquid mixing controller may include a flow control system comprising plurality of injectors that feed liquid and fiber soluble mixture into the mixing tank to produce the fiber fortified liquid mixture.

In another aspect, the injectors that feed the liquid and fiber soluble mixture into the mixing tank of the closed-loop, water mixing controller may be capable of varying the flow rate of liquid and fiber soluble mixture to meet a predetermined concentration level of fiber relative to the liquid volume of the mixture. The flow control system may further include a flow meter device that measures the flow rate of each substance being pumped by the injectors into the mixing tank.

In yet another aspect, the fiber soluble mixture may include fiber, L-Ascorbic Acid, Tocopherols, Zinc Picolinate, Cupric Oxide, Calcium Chloride, Sodium Selenate, Sodium Bicarbonate, Potassium Bicarbonate, and Magnesium Chloride.

In another aspect, the fiber soluble mixture may include a plurality of ingredients such as fiber, L-Ascorbic Acid, Tocopherols, Zinc Picolinate, Cupric Oxide, Sodium Selenate, Sodium Bicarbonate, Potassium Bicarbonate, and Magnesium Chloride in varying percentages or amounts. For example, the fiber soluble mixture may include about 2.5 to about 5 grams of fiber, about 236 milligrams of L-Ascorbic Acid, about 47 milligrams of Tocopherols, about 47 to about 224 milligrams of Zinc Picolinate, about 5 to about 6.25 milligrams of Cupric Oxide, about 5 to about 12.5 milligrams of Sodium Selenate, about 22 to about 496 milligrams of Sodium Bicarbonate, about 17 to about 132 milligrams of Potassium Bicarbonate, about 12 to about 478 mg of Calcium Chloride, and about 24 to about 545 milligrams of Magnesium Chloride. The ingredients of the fiber soluble mixture are mixable with about 16 fluid ounces of liquid, such as water.

In another aspect, the fiber soluble mixture may include a plurality of natural substances including anti-oxidants.

In another aspect, the body of the bottle used to fill the fiber fortified liquid mixture may be constructed of materials that are one-hundred percent plant-based material or marine or land biodegradable material. The labels as well as the lid used in the bottle construction may also be from one-hundred percent plant-based materials.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the terms "including", "includes", "having", "has", "with", or variants thereof, are intended to be inclusive similar to the term "comprising."

The term "therapeutically effective amount" as used with reference to the present formulation and/or components thereof as described herein refers to the quantity of the fiber formulation and/or components thereof necessary to render the desired therapeutic result. For example, an effective amount is a level effective to treat, cure, or alleviate the symptoms of a disorder for which the fiber formulation is being administered. Amounts effective for the particular therapeutic goal sought will depend upon a variety of factors including: lowering blood cholesterol and blood glucose, reduce the risk of osteoporosis, maintain and promote healthy bowel control and movements, prevent constipation, promote weight loss, promote hydration, maintain proper muscle and nerve function, and may maintain alkaline levels in the body to name a few.

As used herein, the term "formulation" or "matrix" are used interchangeably and refers to any combination of two or more components, as defined hereinabove, intended to elicit a desired physiological response from a person that consumes the formulation.

Figure 1:
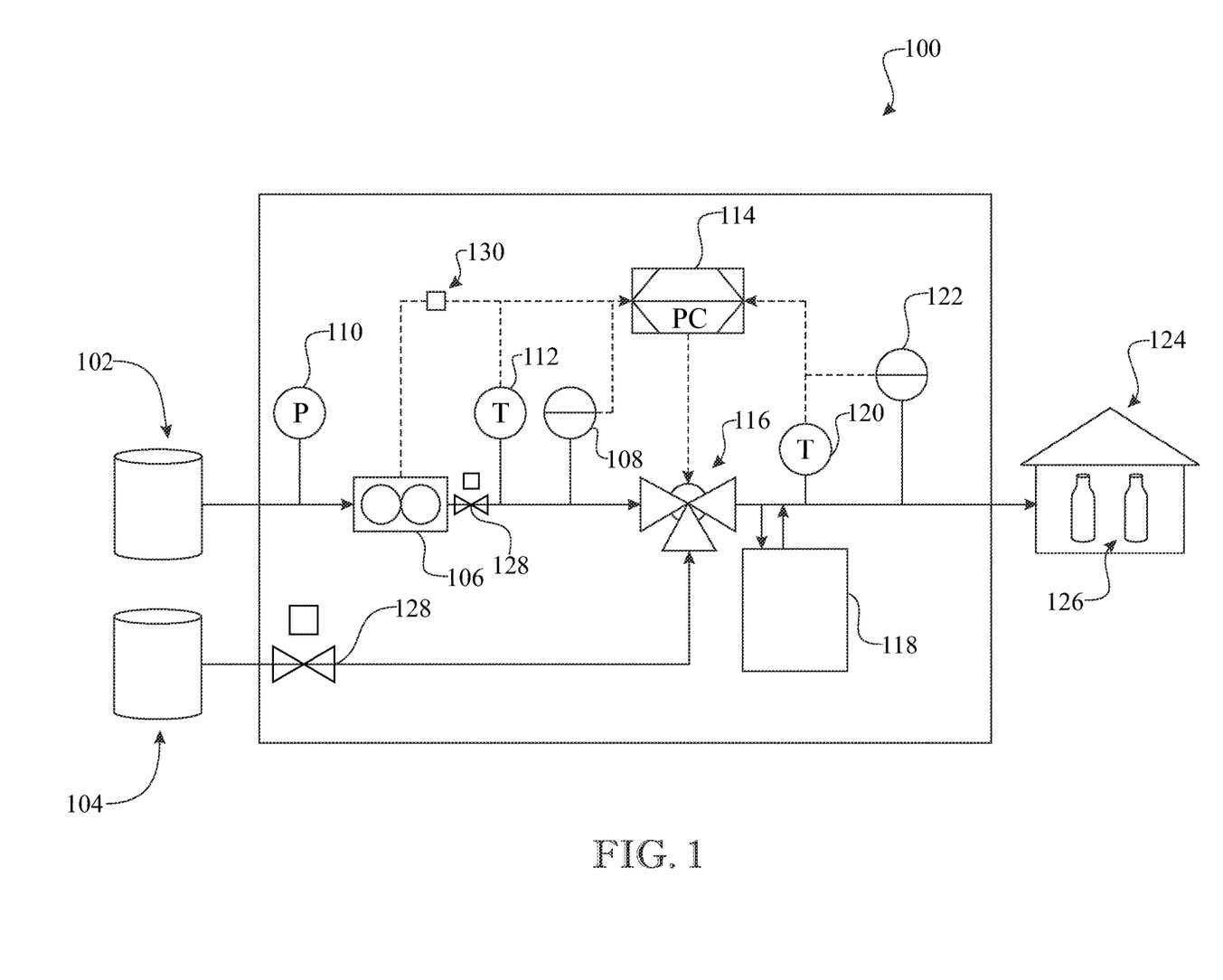
FIG. 1 presents a schematic diagram of a mixing system, in particular, a closed-loop, liquid mixing controller, where liquid, such as water, and a fiber liquid soluble mixture are pumped or otherwise introduced into the water mixing controller and mixed to formulate a fiber-fortified liquid mixture that is bottled and distributable to consumers in a first embodiment of the present invention.

Referring initially to FIG. 1, a schematic diagram of a system of a closed-loop, liquid mixing controller system ("mixing controller system") 100 is generally shown. At an inlet, a liquid source provider 102 connects to the mixing controller system 100. The liquid source provider 102, in one exemplary embodiment, may comprise a large reservoir or tank that contains a consumable liquid, such as drinking water. In some exemplary embodiments, the tank may sustain purified water or include components known in the art to purify water while stagnant in the tank. The tank 102 may also be a pressure tank having a separate water source inlet that receives water from a separate feed source, such as a well, alternative tank, natural spring, etc., and compressed air to create water pressure within the tank. For instance, as the tank 102 fills up with water, the weight of the water begins to compress the air. As the air continues to compress, the pressure within the tank builds, and when the tank reaches a threshold level of internal pressure, it signals to the feed source to cease delivery. When opening the valve on the tank to allow liquid or water into the mixing controller system 100, air pressure bears down on the liquid as it is released from the tank, propelling pressurized liquid through the inlet piping and into the mixing controller system 100.

The mixing controller system 100, shown in FIG. 1, also includes a fiber formulation source reservoir or tank 104. The fiber formulation tank 104 includes a fiber-enriched soluble mixture that is mixable with the liquid source, or water, held in the liquid source tank 102. In one exemplary embodiment, the fiber-fortified or enriched formula comprises natural elements that include a plant-based nutrient ("fiber"), vitamins, such as vitamin C or L-ascorbic acid, vitamin E or its synthetic equivalent, such as tocopherol, zinc picolinate, an inorganic compound, such as cupric oxide, antioxidants, sodium selenite, calcium chloride, sodium bicarbonate, potassium bicarbonate, magnesium sulfate, and magnesium chloride all mixed in a water-soluble mixture.

The fiber formulation tank 104 includes a network of conduits or piping that feed the soluble fiber formulation to a mixing control valve 116 that regulates the flow of fiber formulation into a mixing tank 118. Similarly, the liquid source tank 102 includes a plurality of conduits that reach the same mixing control valve 116 that controls the instream of liquid into the mixing tank 118. The mixing controller system 100, in one exemplary embodiment, includes a feedback and control system that includes various sensors and control valves regulating several aspects of the liquid and fiber formulation being fed into the mixing tank 118. For instance, the feedback control system 130 of the mixing controller system 100 includes pressure sensors 110 measuring the viscous liquid pressure within the tank 102 and the pressure in the conduit network of the mixing controller system 100. The system also includes a flow meter 106 measuring the volume or mass of the liquid traversing the cross-sectional area of the conduit leading to and exiting out of the mixing valve 116. Proximate to the flow meter 106, the feedback and control system 130 controls a flow control valve 128 to help regulate the volume of liquid traversing the conduit. The system also includes temperature sensors 112 for measuring the temperature of the liquid and ensuring the system maintains the liquid temperature within acceptable thresholds. For example, via the use of the sensors, the system ensures that the liquid ambient temperature remains at less than 145 degrees, making internal adjustments to maintain the desired temperature of the liquid.

The pressure sensor 110, flow rate meter 106, temperature sensor 112, control mixing valve, flow rate valves 128, and tilt hydrometers 108, 122, which measure the density of the liquid inside of the conduit network, as well as the remaining known electrical components that comprise the feedback system 130, are controlled by a computing system including a tangible computer-readable storage medium, such as an electronic device or computer 114. The computing system 114 of the mixing controller system 100 controls the temperature rates within the system, flow rates, mixing levels of liquid to fiber formulation levels, and more. In one exemplary embodiment, the computing system 114 is operated by a user that monitors the mixing process. The computing system 114 may include machine-executable program instructions or computer application programs associated with the mixing of the liquid with the enriched fiber formulation in the tanks 102 and 104, respectively. The executable programs are stored on one or more machine readable mediums, including but not limited to, optical disk, magnetic or optical card or tape, flash memory, CD/DVD-ROM, memory dongle, magnetic storage media such as a hard drive or any other external machine-readable medium coupled to server or server computer via, I/O interface. The electronic device may also include any volatile or non-volatile media such as RAM (e.g. SDRAM, DDR SDRAM, RDRAM, SRAM, etc.), ROM, EEPROM, or EPROM. The electronic device may further include audio and video circuitry, a keyboard or touchpad, and a visual screen or display for viewing and directing the mixing process of the fluid and soluble mixture.

In one exemplary embodiment, the computing system 114 controls and moderates the flow rate of liquid coming into the system 100, toward the mixing control 116 by using control valve 128. The pressure, temperature, and density of the steady stream of liquid flowing from the liquid source tank 102 is closely monitored by the computing system 114 that is in electronic communication feedback control system 130 that controls and is in electronic communication with the pressure sensor 110, temperature sensor 112, hydrometer 108, and flow rate meter 106 the system has to offer. If the feedback control system 130 overseen by the computing system 114 detects that the pressure or the flow rate of the liquid in the system is not adequate, utilizing the flow control valve, the control system 130 makes internal adjustments by electronically communicating with the control valve to regulate flow within the acceptable threshold. Flow rates will vary depending on system parameters and bottling regulations in accordance with local laws.

Similarly, the computing system 114 monitors the ingress of fiber formulation flowing to the mixing controller of the system through control valve 128. When liquid and fiber formulation reaches the mixing controller 116, the computing system, having already been programmed to execute a prescribed set of commands, allows a certain amount of liquid into the mixing tank relative to soluble fiber formulation 118 to form a fiber fortified liquid mixture. The fiber fortified liquid mixture continues to a bottling machine 124 that utilizes injectors to dispense fiber fortified liquid mixture into specialized bottles 126. The control system 100 checks the fiber fortified liquid mixture's temperature levels and density levels using a temperature sensor 120 and hydrometer 122 when bottling the liquid mixture. In one exemplary embodiment, if pasteurizing with hot-fill bottles, the temperature of the fiber formulation will be greater than 145 degrees Fahrenheit. If using flash pasteurization, bottles will be filled at less than 145 degrees Fahrenheit. The hydrometer sensor could be upstream or downstream the flash pasteurizer to ensure the fiber formulation levels fall within the acceptable parameters. In one exemplary embodiment, one will appreciate that each specialized bottle 126 used in the bottling process comprises a material made out of plants. For instance, the shaped body of bottle 126 may be made entirely out of 100 percent plant-based material and include a design or configuration that provides stability (i.e., does not tip easily). Likewise, the bottle cap, instead of the cap being made out of plastic, the cap is made out of plant-based material. The same can be understood for the labels used on the bottle (i.e., the labels are also made out of plant-based materials). The bottles may also be made out of recycled PET plastic (rPET), and specifically Prevented Ocean Plastic™, which is rPET within a defined distance from an ocean coastline or major waterway. Alternatively, yet within the scope of the instant invention, bottles made out of plant-based biodegradable plastics, such as PLA, and marine biodegradable plastics, such as PHA, may be used. While the bottle size of each bottle may vary, in one exemplary embodiment, the system may package individual bottles with about 16 liquid ounces of the fiber fortified liquid mixture. This particular size of bottle holds enough fiber fortified liquid mixture to satisfy the recommendation of daily fiber consumption for a single consumer. Alternatively, the system 100 may package the fiber fortified liquid mixture in bottles that can hold within a minimum range of about 500 milliliters, with a preferred packaging size of about 1 liter. Allowing consumers to store a healthy supply of the fiber fortified liquid mixture and accessible for multiple consumers' daily consumption.

In this regard, each bottle 126 includes a mixture of liquid, which in this case is water, and the soluble fiber-enriched mixture. As outlined above, the fiber fortified liquid mixture generally includes natural elements that include a plant-based nutrient ("fiber"), vitamins, such as vitamin C or L-ascorbic acid, vitamin E or a synthetic form such as tocopherol, zinc picolinate, inorganic compound such as cupric oxide, sodium selenate, sodium bicarbonate, calcium chloride, potassium bicarbonate, magnesium sulfate, and magnesium chloride all mixed in a water-soluble mixture.

As shown below, Table 1 illustrates a first exemplary implementation of the elements of one exemplary formulation of the fiber-fortified mixture in a therapeutic amount.

TABLE 1

Formulation

| Ingredients | Up to Amounts |
|---|---|
| Soluble Fiber | 20 mg/ml |
| L-Ascorbic Acid | 0.25 mg/ml |
| Natural Mixed Tocopherols | 0.05 mg/ml |
| Zinc Picolinate | 0.25 mg/ml |
| Cupric Oxide | 0.01 mg/ml |
| Sodium Selenate | 0.02 mg/ml |
| Sodium Bicarbonate | 0.25 mg/ml |
| Potassium Bicarbonate | 1.0 mg/ml |
| Magnesium Chloride | 0.30 mg/ml |
| Calcium Chloride | 0.50 mg/ml |
| Water | 500 ml (minimum) |

In a secondary exemplary implementation, a simplified yet still effective formulation of the fiber-fortified mixture may include filtered water, soluble fiber powder, potassium bicarbonate, and magnesium sulfate. More specifically, the fiber-fortified mixture may include up to 20 mg of soluble fiber powder per milliliter of liquid or filtered water, up to 1 mg of potassium bicarbonate per milliliter of liquid or filtered water, and up to 0.30 mg magnesium sulfate per milliliter of liquid or filtered water. The pH level of the formulation, in one exemplary embodiment, is adjustable and may comprise between 4 pH and 11 pH.

Figure 2:
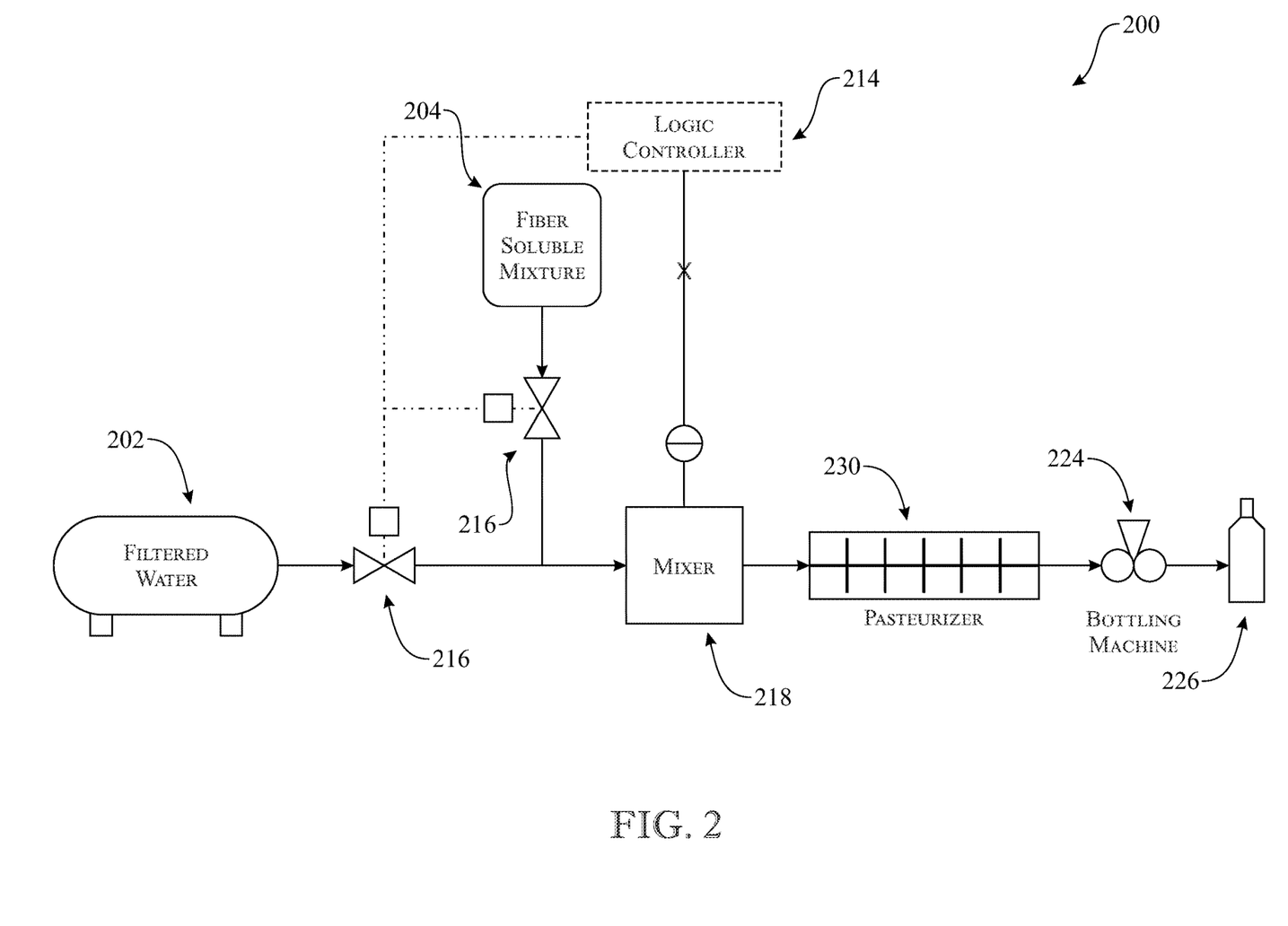
FIG. 2 presents a schematic diagram of a mixing system, in particular, an exemplary embodiment of an open loop fiber water mixing system.

With reference now to FIG. 2, a schematic diagram of a system of an open-loop, liquid mixing controller system ("mixing controller system" or "system") 200 is generally shown in an exemplary embodiment of the present invention. The mixing controller system 200 includes a liquid source provider 202, which in some instances is a reservoir with filtered water. The liquid source provider 202 is connected to a conduit that feeds into the controller system and connects a mixer 218. The conduit extending from the liquid source provider 202 and the mixer 218 includes a control valve 216 that may control the flow of liquid flowing within the conduit from the source provider 202 to the mixer 218. The Mixing controller system 200 further includes a fiber soluble mixture source 204. The fiber source reservoir 204 may also include a conduit or otherwise a pathway that extends or otherwise connects the fiber source 204 to the mixer 218. The conduit extending between the fiber source 204 and the mixer 218 may also include a control valve 216 that controls the flow of the fiber mixture inside the fiber source reservoir 204 to the mixer 218. The fiber mixture inside of the fiber source reservoir 204, in one exemplary embodiment, may comprise the ingredients in the exemplary amounts provided hereinabove.

The mixing controller system 200 in an exemplary embodiment produces a fiber fortified formulation by uniquely mixing the liquid source inside the liquid source reservoir 202 with the novel fortified beverage fiber solution inside the soluble fiber mixture reservoir 204. The formula used to produce the fortified beverage is as follows, where $\Psi$ is the desired fiber concentration of the bottled formulation.

$$V_{MIXTURE} = V_{FIBER} + V_{LIQUID}$$

$$V_{FIBER} = \frac{\Psi V_{MIXTURE}}{\Psi + 1}$$

$$\Psi = \frac{V_{FIBER}}{V_{LIQUID}}$$

As shown in the exemplary FIG. 2, A computer or controller system 214 is electronically connected to the control valves 216. The controller system 214 further controls additional sensors, such as ultrasonic sensors, pressure sensors, or float sensors, to control the liquid volume or height of the liquid pumped into the mixer 218 from the fiber source reservoir 204 and liquid source reservoir 202. Although it is generally contemplated that the valves that control the flow of liquid and fiber are to be controlled electronically, the valves can be controlled manually or remotely. The fiber formulation, as shown, is passed through a pasteurizer 230 and pasteurized. In one exemplary form, pasteurization requires temperatures of about 63° C. (145° F.) maintained for 30 minutes or, alternatively, heating to a higher temperature, 72° C. (162° F.), and holding for 15 seconds. The fiber formulation can be pasteurized as a concentrated compound or fiber concentrated solution. In other words, although not shown in FIG. 2, the pasteurizer 230 may be used to pasteurize the fiber solution mixture before the solution reaches the mixer 218. The pasteurized fiber formulation is then fed to a bottling machine 224 that utilizes injectors to dispense fiber-fortified liquid mixture into specialized bottles 226. In an alternative embodiment, the system may further include pasteurization via hot-fill direct to the bottles. Moreover, fiber formulation liquid may be pushed through an Ozone contact tank after mixing for sterilization, upstream or downstream of pasteurization.

Figure 3:
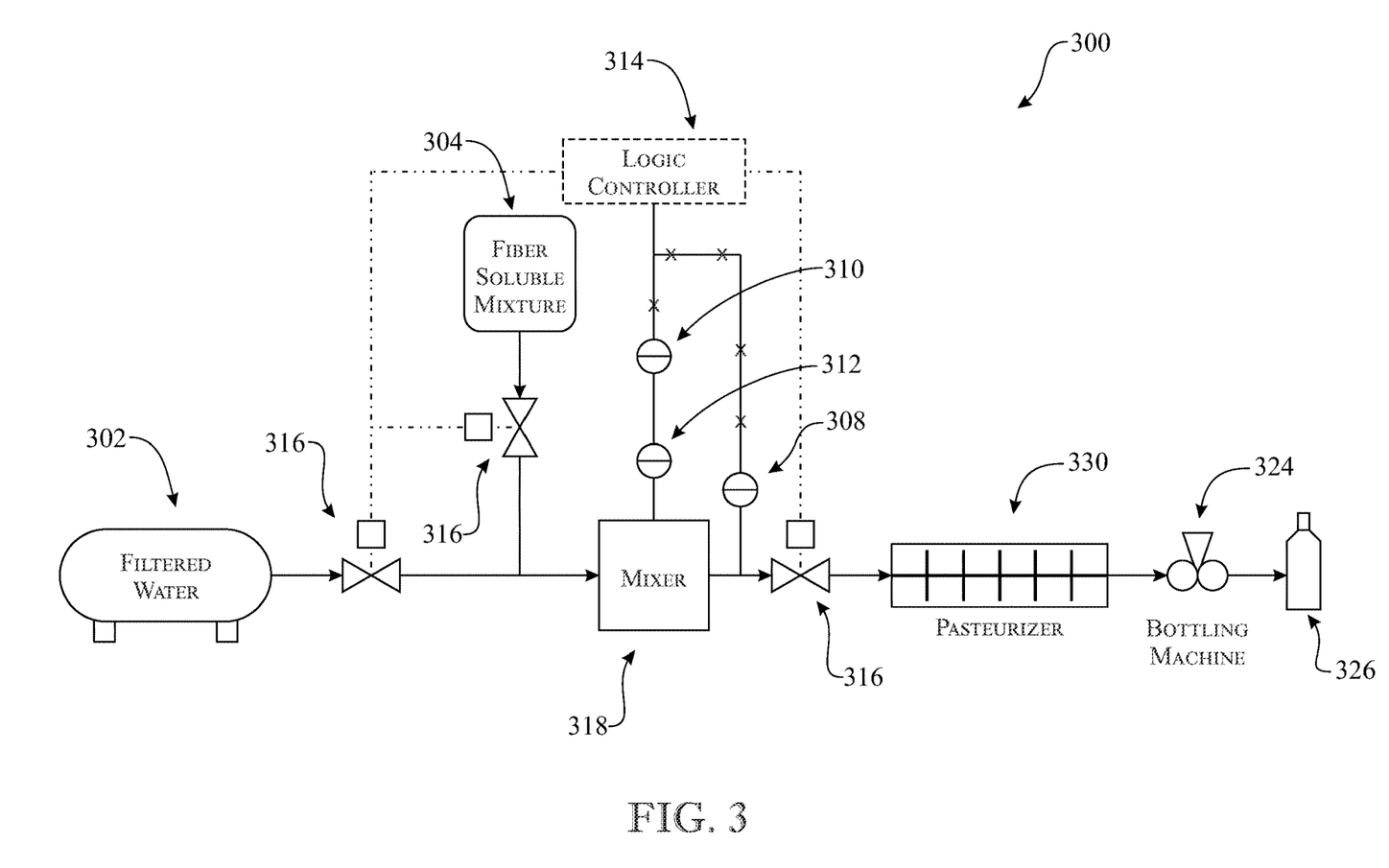
FIG. 3 presents a schematic diagram of a mixing system, in particular, an exemplary embodiment of a closed-loop fiber water mixing and filing system.

With reference now to FIG. 3, a schematic diagram of a system of a closed-loop, liquid mixing controller system ("mixing controller system" or "system") 300 is generally shown in an exemplary embodiment of the present invention. In this exemplary embodiment, the mixing controller system 300 includes a liquid source provider 302. The liquid source provider 302 is connected to a conduit that feeds into the controller system and connects to a mixer 318. The conduit extending from the liquid source provider 302 and the mixer 318 includes a control valve 316 that may control the flow of liquid flowing within the conduit. As shown, the mixing controller system 300 further includes a fiber soluble mixture source reservoir 304. The fiber source reservoir 304 may also include a conduit or otherwise a pathway that extends or otherwise connects the fiber source 304 to the mixer 318. The conduit extending between the fiber source 304 and the mixer 318 may also include a control valve 316 that varies the flow of the fiber soluble mixture inside the fiber source reservoir 304 to the mixer 318. The system 300 further includes a plurality of pressure sensors 310 and valves and controller system 314 that aid in the control of producing the desired concentration of the fiber formulation in real-time with feedback validation. The formulations utilized to bottle the desired fiber concentration are as follows:

$$Q_{MIXTURE} = Q_{FIBER} + Q_{LIQUID}$$

$$Q_{FIBER} = \frac{\Psi Q_{MIXTURE}}{\Psi + 1}$$

$$\Psi = \frac{Q_{FIBER}}{Q_{LIQUID}}$$

In this exemplary embodiment, the fiber fortified beverage is produced by supplying the mixer 318 or mixing tank with filtered water inside of the liquid reservoir 302. The instream of filtered water into the mixer is controlled by control valve 316. A fiber concentrated solution inside of the fiber soluble reservoir 304 is also supplied to the mixer 318. The flow of fiber concentration solution into the mixer is controlled by valve 316. The flow rates and concentration rates that are allowed into the mixer 318 are electronically calculated by the controller system 314 using the above-referenced formulations in a closed-loop controller with real-time validation. The controller system 314 is used to control the flow rates and mixing does so by opening and closing valves 316. The commands to open, close, partially open, or partially close the valves is done via automatic electronic commands via the controller system 314, that in real-time measures the flow rates and mixing rates using feedback sensors 310 in the closed-loop system. Instrumentation, such as hydrometers 308 and temperature sensors 312 are used to calculate fiber concentrations in the bottled liquid formulation. Alternatively, a liquid level sensor may be utilized in lieu of the hydrometer sensor and temperature sensor to calculate fiber concentrations in the bottled liquid formulation. The sensors used to produce fiber concentration measurements provide instant feedback that drives the closed-loop controller system 314 providing automated quality control that isolates output or adjusts fiber concentrations in real-time based on user-input boundaries, i.e., parameters. The fiber formulation then passes through a pasteurizer 330 and is pasteurized. The fiber formulation can be pasteurized as a concentrated compound, diluted compound, or fiber concentrated solution. The pasteurized fiber formulation is then fed to a bottling machine 324 that utilizes injectors to dispense fiber-fortified liquid mixture into specialized bottles 326. As stated above, the fiber formulation liquid may be pushed through an Ozone contact tank after mixing for sterilization, upstream or downstream of pasteurization. In an alternative embodiment, the system may further include pasteurization via hot-fill direct to the bottles.

Figure 4:
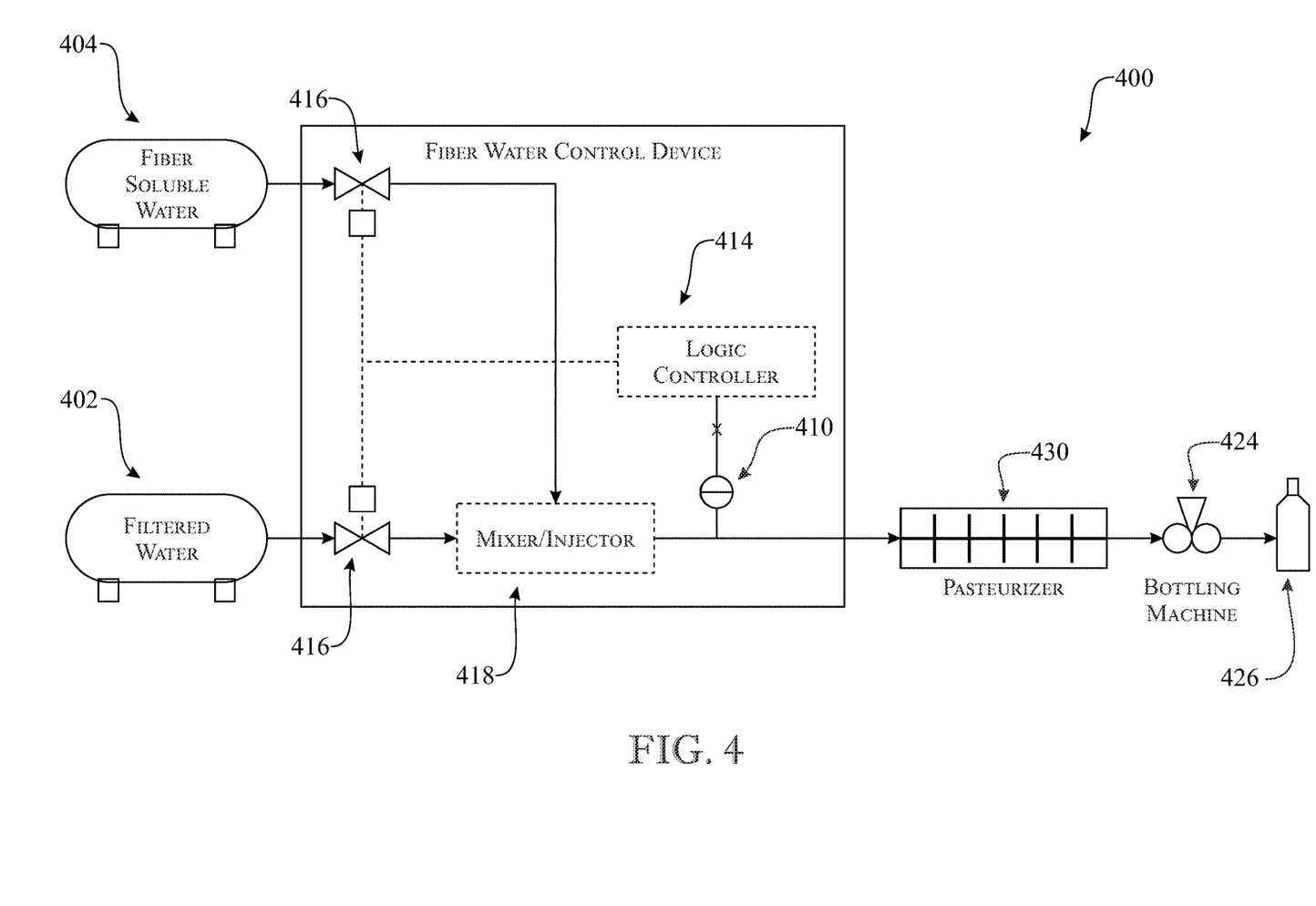
FIG. 4 presents a schematic diagram of a mixing system, in particular, an exemplary embodiment of an integrated closed-loop fiber water mixing and filling system.

With reference now to FIG. 4, a schematic diagram of a system of an integrated closed-loop, liquid mixing controller system ("mixing controller system" or "system") 400 is generally shown in an exemplary embodiment of the present invention. The system 400, having similar components as systems 100, 200, 300, provides an integrated real-time fiber concentrate flow controller with feedback validation to bottle the fiber-rich formulation. The flow rates used to calculate the concentrations levels of pH and ingredients to produce a therapeutic amount of fiber formulation are governed by the equation provided hereinabove. In this particular embodiment, the mixing controller system 400 includes a liquid source provider 402 and a fiber soluble mixture provider 404. The liquid source provider 402 is connected to a conduit that feeds into the controller system and connects to an injection mixing system 418. The conduit extends from the liquid source provider 402 and the injection mixing system 418 includes a control valve 416 that may control the flow of liquid flowing within the conduit. The fiber source reservoir 404 may also include a conduit that connects the fiber source 404 to the injection mixing system 418. The conduit extending between the fiber source 404 and the mixing injection system 418 may also include a control valve 416 that varies the flow of the fiber soluble mixture inside the fiber source reservoir 404 to the injection system 418. System 400 is an integrated system that mixes a liquid, such as water, and a soluble fiber mixture at a variable flow rate and desired fiber concentration, using a closed loop logic controller 414 with real time validation.

The computer or logic controller 414 is used to control flow rate and mixing rates and controls valves 416, which are electronically commanded by the logic controller to achieve the desired fiber formulation that is to be bottled. The logic controller 414 is electronically connected to a feedback sensor 410 that provides real time values to the logic controller 414 to confirm whether the fiber formulation is within the desired parameters. The injection mixing system 418 of the system 400 includes injectors that provide mixed liquid and fiber soluble mixture, forming the fiber formulation, pumps at variable rates the fiber formulation into a pasteurizer 430. Mixing of the liquid and fiber soluble mixture may be done in some exemplary embodiments at a high flow rate, thereby eliminating the need for holding tanks to store the mixed liquid and fiber mixture, i.e., the fiber formulation. The elimination of the holding tanks, in this particular embodiment, improves efficiency to deliver and bottle the fiber formulation beverage. The logic controller 414 that is connected to a plurality of sensors, as shown and described hereinabove, provides constant real time feedback to the controller. The controller in response to said feedback makes adjustments to the flow rates of each independent source of liquid or soluble fiber mixture to ensure that the fiber formulation is within the desired parameters. The pasteurized fiber formulation is then passed to a bottling machine 424 that bottles the liquid inside of specialized bottles 426. As stated above, the fiber formulation liquid may be pushed through an Ozone contact tank after mixing for sterilization, upstream or downstream of pasteurization. In an alternative embodiment, the system may further include pasteurization via hot-fill direct to the bottles.

One will appreciate that each bottle may include any one of the above-mentioned fiber fortified mixture formulations. In summary, the invention generally comprises a system for mixing a fiber fortified mixture formulation comprising a number of natural elements that are consumable on a daily basis. The fiber fortified mixture is made and bottled by a mixing controller system 100 that includes a plurality of elements that have been outlined above. The fiber fortified mixture is designed to provide numerous benefits, which include but are not limited to, lowering blood cholesterol and blood glucose, reduce the risk of osteoporosis, maintain and promote healthy bowel control and movements, prevent constipation, promote weight loss, promote hydration, maintain proper muscle and nerve function, and maintain alkaline levels in the body.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A fortified water mixing system, comprising:
a first reservoir for holding a liquid;
a second reservoir for holding a fiber mixture;
a mixing reservoir;
at least one control valve operable to selectively allow or prevent fluid communication from the first reservoir and the second reservoir to the mixing reservoir;
a logic controller electronically connected to the at least one control valve,
wherein the logic controller controls opening and closing positions of the at least one control valve to control a flow of liquid and fiber mixture from the first reservoir and second reservoir, respectively, into the mixing reservoir to produce a fiber formulation; and
a bottling machine in fluid communication with the mixing reservoir for bottling the fiber formulation.

2. The fortified water mixing system of claim 1, comprising a pasteurizer disposed between the mixing reservoir and the bottling machine to pasteurize the fiber formulation before bottling.

3. The fortified water mixing system of claim 1, wherein the system further includes a plurality of sensors electronically connected to the logic controller, each sensor detecting temperature, density, pH levels, or concentration levels of the fiber formulation.

4. The fortified water mixing system of claim 3, wherein the logic controller includes a set of executable commands outlining mixture parameters to produce a desired therapeutic concentration of the fiber formulation, and the sensors provide feedback to the logic controller to determine if the fiber formulation is within a threshold of the desired therapeutic concentration, if the fiber formulation is not within the desired therapeutic concentration the logic controller adjusting the mixture parameters.

5. The fortified water mixing system of claim 1, wherein the fiber formulation comprises an amount of filtered water, a therapeutic amount of soluble fiber powder, a therapeutic amount of potassium bicarbonate, and a therapeutic amount of magnesium sulfate.

6. The fortified water mixing system of claim 5, wherein the therapeutic amount of the soluble fiber powder is up to 20 mg per milliliter of the filtered water.

7. The fortified water mixing system of claim 5, wherein the therapeutic amount of the potassium bicarbonate is up to 1ing per milliliter of the filtered water.

8. The fortified water mixing system of claim 5, wherein the therapeutic amount of the magnesium sulfate is up to 0.30 mg per milliliter of the filtered water.

9. The fortified water mixing system of claim 5, wherein the fiber formulation includes a pH level of greater than 4 but less than 11.

10. The fortified water mixing system of claim 5, wherein the bottling machine bottles the fiber formulation in bottles made out of a recycled PET plastic.

11. A fortified water mixing system, comprising:
a first reservoir for holding a filtered water;
a second reservoir for holding a fiber mixture;
a mixing system;
at least one control valve operable to selectively allow or prevent fluid communication from the first reservoir and the second reservoir to the mixing system;
a logic controller electronically connected to the at least one control valve,
wherein the logic controller controls opening and closing positions of the at least one control valve to control a flow of liquid and fiber mixture from the first reservoir and second reservoir, respectively, into the mixing system to produce a fiber formulation, wherein the fiber formulation comprises an amount of filtered water, a therapeutic amount of soluble fiber powder, a therapeutic amount of potassium bicarbonate, and a therapeutic amount of magnesium sulfate, and wherein the fiber formulation includes a pH level between 4 and 11;
a pasteurizer configured to pasteurize the fiber formulation produced by the mixing system; and
a bottling machine in fluid communication with the pasteurizer for bottling the fiber formulation pasteurized by the pasteurized.

* * * * *